US010945188B2

(12) United States Patent
Rios Almanza et al.

(10) Patent No.: US 10,945,188 B2
(45) Date of Patent: *Mar. 9, 2021

(54) SYSTEMS FOR CONNECTING DEVICES THROUGH INTERMEDIATE NODES

(71) Applicant: Bridgefy, Inc., San Francisco, CA (US)

(72) Inventors: Jorge Luis Rios Almanza, Nuevo Leon (MX); Diego Ivan Garcia Escobedo, Cuauhtemoc (MX); Roberto Betancourt Sanchez, Mexico City (MX); Daniel Felipe Heredia Saucedo, Monterrey (MX)

(73) Assignee: Bridgefy, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,813

(22) Filed: Jun. 13, 2019

(65) Prior Publication Data

US 2019/0297556 A1    Sep. 26, 2019

Related U.S. Application Data

(63) Continuation of application No. 15/675,393, filed on Aug. 11, 2017, now Pat. No. 10,368,288.
(Continued)

(51) Int. Cl.
*H04W 40/04* (2009.01)
*H04W 84/12* (2009.01)
(Continued)

(52) U.S. Cl.
CPC ....... *H04W 40/04* (2013.01); *H03M 13/3761* (2013.01); *H04B 7/15528* (2013.01);
(Continued)

(58) Field of Classification Search
CPC ............... H03M 13/373; H04L 1/1809; H04L 12/1854; H04W 36/30; H04W 40/24
See application file for complete search history.

(56) References Cited

U.S. PATENT DOCUMENTS 5,550,848 A * 8/1996 Doshi ................... H04L 1/1848
714/749
6,389,019 B1 * 5/2002 Fan ...................... H04L 12/5601
370/233

(Continued)

OTHER PUBLICATIONS

United States Office Action, U.S. Appl. No. 16/513,640, dated Jun. 5, 2020, five pages.
(Continued)

*Primary Examiner* — Melanie Jagannathan
(74) *Attorney, Agent, or Firm* — Fenwick & West LLP

(57) ABSTRACT

Methods and systems are presented in this disclosure that enable mobile devices without access to an active network connection (e.g. cellular, satellite or Internet network) to communicate between each other by sending and receiving data packets (e.g. text, location, or image) through a mesh of connected devices. A mobile device receives a request to send a packet having an identifier of a recipient device. Based on the identifier, the mobile device determines whether the recipient device is in a list of mobile devices within a wireless range of the mobile device. Based on the determination, the mobile device includes the packet into an outgoing queue having packets for forwarding. The mobile device establishes one or more connections with one or more mobile devices in the list, and forwards one or more packets from the outgoing queue to the one or more mobile devices using the one or more connections.

9 Claims, 8 Drawing Sheets

Related U.S. Application Data

(60) Provisional application No. 62/376,781, filed on Aug. 18, 2016.

(51) Int. Cl.

| | | |
|---|---|---|
| *H04L 9/08* | (2006.01) | |
| *H04B 7/155* | (2006.01) | |
| *H03M 13/37* | (2006.01) | |
| *H04W 40/24* | (2009.01) | |
| *H04L 29/08* | (2006.01) | |
| *H04W 88/04* | (2009.01) | |
| *H04W 72/04* | (2009.01) | |
| *H04W 88/18* | (2009.01) | |
| *H03M 13/09* | (2006.01) | |
| *H04L 5/00* | (2006.01) | |
| *H04W 84/18* | (2009.01) | |
| *H04L 12/823* | (2013.01) | |
| *H04W 76/14* | (2018.01) | |
| *H04B 7/26* | (2006.01) | |

(52) U.S. Cl.
CPC ........ *H04L 9/0847* (2013.01); *H04L 67/2838* (2013.01); *H04W 40/24* (2013.01); *H04W 84/12* (2013.01); *H04W 88/04* (2013.01); *H03M 13/09* (2013.01); *H04B 7/15542* (2013.01); *H04B 7/2606* (2013.01); *H04L 5/0055* (2013.01); *H04L 47/32* (2013.01); *H04L 2209/80* (2013.01); *H04W 72/0426* (2013.01); *H04W 72/0433* (2013.01); *H04W 76/14* (2018.02); *H04W 84/18* (2013.01); *H04W 88/182* (2013.01)

(56) References Cited

U.S. PATENT DOCUMENTS

| | | | |
|---|---|---|---|
| 6,493,318 B1 * | 12/2002 | Bare | H04L 45/02 370/238 |
| 6,611,231 B2 | 8/2003 | Crilly et al. | |
| 6,700,867 B2 * | 3/2004 | Classon | H04L 1/1671 370/216 |
| 6,731,628 B1 | 5/2004 | Shiomoto | H04Q 11/0478 370/352 |
| 7,180,896 B1 * | 2/2007 | Okumura | H04L 1/1628 370/394 |
| 7,376,880 B2 | 5/2008 | Ichiki et al. | |
| 7,450,512 B1 * | 11/2008 | Young | H04L 1/1874 370/235 |
| 7,660,318 B2 | 2/2010 | Rahman et al. | |
| 7,801,143 B2 | 9/2010 | Gossain et al. | |
| 7,843,819 B1 | 11/2010 | Benveniste | |
| 8,081,658 B2 | 12/2011 | Zuniga et al. | |
| 8,243,710 B1 | 8/2012 | Benveniste | |
| 8,301,955 B2 | 10/2012 | Benveniste | |
| 8,699,377 B2 | 4/2014 | Veillette | |
| 8,718,093 B2 | 5/2014 | Zuniga et al. | |
| 9,160,553 B2 | 10/2015 | Wu et al. | |
| 9,319,956 B2 | 4/2016 | McManus et al. | |
| 9,521,584 B2 | 12/2016 | Nanda et al. | |
| 9,602,296 B2 | 3/2017 | Wu et al. | |
| 10,420,006 B2 | 9/2019 | Rios Almanza et al. | |
| 2002/0044549 A1 | 4/2002 | Johansson et al. | |
| 2003/0046426 A1 | 3/2003 | Nguyen | |
| 2004/0105393 A1 * | 6/2004 | Ronneke | H04L 47/52 370/252 |
| 2005/0154965 A1 * | 7/2005 | Ichiki | H03M 13/373 714/776 |
| 2006/0265212 A1 * | 11/2006 | Fitzgerald | H04L 47/568 704/211 |
| 2007/0115823 A1 * | 5/2007 | Shen | H04L 1/1874 370/235 |
| 2007/0291661 A1 * | 12/2007 | Nishibayashi | H04L 12/66 370/252 |
| 2008/0052589 A1 * | 2/2008 | Shinohara | H04L 1/1812 714/748 |
| 2009/0180444 A1 * | 7/2009 | McManus | H04W 36/30 370/332 |
| 2010/0172335 A1 * | 7/2010 | Mok | H04L 1/1877 370/338 |
| 2013/0024541 A1 * | 1/2013 | Ziegler | H04L 47/266 709/217 |
| 2013/0272110 A1 * | 10/2013 | Eriksson | H04L 1/1867 370/216 |
| 2014/0269302 A1 * | 9/2014 | Morandin | H04L 47/27 370/235 |
| 2015/0117177 A1 * | 4/2015 | Ganga | H04L 1/1621 370/216 |
| 2015/0244635 A1 * | 8/2015 | Orten | H04W 4/70 370/230 |
| 2015/0245351 A1 * | 8/2015 | Banerjea | H04L 69/22 370/338 |
| 2016/0028675 A1 * | 1/2016 | Veillette | H04L 12/1854 370/312 |
| 2017/0156076 A1 * | 6/2017 | Eom | H04W 24/04 |
| 2018/0054853 A1 | 2/2018 | Almanza et al. | |

OTHER PUBLICATIONS

United States Office Action, U.S. Appl. No. 15/676,393, dated Jan. 13, 2019, 14 pages.

* cited by examiner

600

```
Receive a packet that encapsulates information or
data
602
                    │
                    ▼
Determine whether the packet is dedicated to the
apparatus or to be delivered to one or more devices
within range of the apparatus
604
                    │
                    ▼
Determine whether the packet is expired
606
                    │
                    ▼
Include the packet into a mesh forwarding list
comprising a plurality of packets of a same structure
for forwarding to the one or more devices, if the
packet is to be delivered to the one or more devices
and the packet is not expired
608
                    │
                    ▼
Receive notification about at least one new
connection to the one or more devices
610
                    │
                    ▼
Check, in each packet within the mesh forwarding
list, a list with at least one identifier of at least one
device that received the packet
612
                    │
                    ▼
Forward the mesh forwarding list to the one or more
devices via the at least one new connection, based
on the checked one or more identifiers
614
```

FIG. 6

SYSTEMS FOR CONNECTING DEVICES THROUGH INTERMEDIATE NODES

CROSS REFERENCE TO RELATED APPLICATION

This application is a continuation of U.S. application Ser. No. 15/675,393, filed Aug. 11, 2017, which claims priority to U.S. Application No. 62/376,781, filed Aug. 18, 2016, which is incorporated herein by reference in its entirety.

BACKGROUND

This disclosure generally relates to systems and methods for wireless communications, and more particularly relates to systems and methods for connecting devices through intermediate nodes.

In various situations, stable and reliable cellular, satellite and Internet connections can all be unavailable. In order to provide connectivity to wireless devices without cellular, satellite and Internet connections, wireless devices may communicate between each other through a mesh of devices connected through a local mesh network.

A wireless communication network can be realized through the use of a mesh network. A mesh network is a distributed network having multiple wireless mesh points or wireless nodes. Each mesh wireless node in the mesh network may act as a relay node capable of receiving wireless signals and relaying the wireless signals to the next mesh wireless node in the mesh network. A wireless signal may proceed from an origination mesh wireless node to a destination mesh wireless node by hopping from one mesh wireless node to another mesh wireless node. Existing systems and methods for routing wireless signals through the mesh network need to insure that the signals are routed efficiently from their origination mesh wireless node to their destination mesh wireless node.

SUMMARY

Disclosed embodiments include methods and systems by which mobile devices that do not have connectivity to a network ("unattached devices") can still communicate by sending and receiving packets (e.g., text messages, locations, images, etc.) through a local mesh of inter-connected mobile devices. In general, a packet may comprise information or data to be communicated between mobile devices of the local mesh. The information encapsulated into the packet may comprise a text message, an image, location information, voice content, or some other data content that can be communicated between mobile devices.

Disclosed embodiments include methods for mesh forwarding of packets from an unattached device to nearby devices of the local mesh. In some embodiments, a mobile device executes a method for mesh forwarding of packets. The mobile device receives from an unattached mobile device (i.e., a device that does not have a connection to a network other than the local mesh) a request to forward a packet previously received at the mobile device, the packet includes an identifier of a recipient device of the packet. The packet therefore has a destination on the local mesh network. The mobile device determines, based on the identifier, whether the recipient device of the packet is in a list of mobile devices within the wireless range of the mobile device. The mobile device includes, based on the determination, the packet into a local outgoing queue in the memory of the mobile device, where the queue comprises a list of packets to be forwarded. The mobile device establishes one or more wireless connections with one or more mobile devices in the list of mobile devices. Upon including the packet into the local outgoing queue, the mobile device decrements a value in the packet indicating a remaining number of times the packet is allowed to be transferred from one mobile device to another mobile device. The mobile device forwards, in accordance with the decremented value, the packet from the local outgoing queue to the one or more mobile devices via the established one or more wireless connections.

Disclosed embodiments include an apparatus for wireless communication (i.e., wireless device, mobile device, or wireless node). The apparatus includes a first module (i.e., a messaging module) and a second module (i.e., a connectivity module) coupled to the first module. The first module is configured to receive a request to forward a packet previously received at the apparatus, the packet includes an identifier of a recipient device of the packet. The first module is further configured to determine, based on the identifier, whether the recipient device is in a list of wireless devices within a wireless range of the apparatus, and to include, based on the determination, the packet into an outgoing queue comprising a list of packets to be forwarded. The second module is configured to establish one or more wireless connections with one or more wireless devices in the list of wireless devices. The first module decrements, upon including the packet into the outgoing queue, a value in the packet indicating a remaining number of times the packet is allowed to be transferred from one wireless device to another wireless device. After that, the first module forwards, in accordance with the decremented value, the packet from the outgoing queue to the one or more wireless devices via the established one or more wireless connections.

BRIEF DESCRIPTION OF THE DRAWINGS

FIG. 6 is a flow chart illustrating a method for mesh forwarding that is implemented at a Mesh Forwarder sub-module of the Message Manager module shown in FIG. 5, in accordance with embodiments of the present disclosure.

Figure 1:
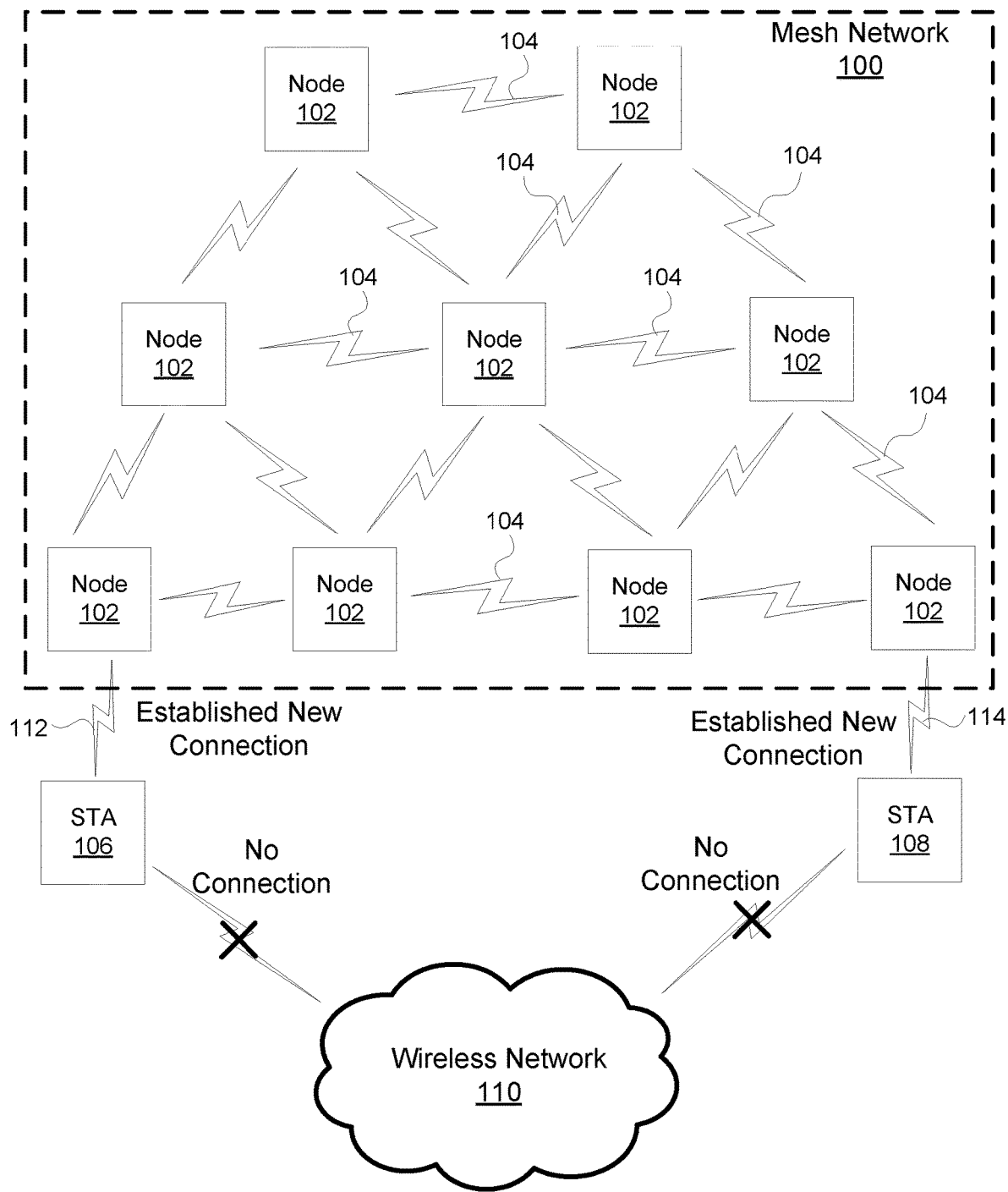
FIG. 1 is an example mesh network comprising a plurality of communicating wireless devices or nodes, in accordance with embodiments of the present disclosure.

The figures depict embodiments of the present disclosure for purposes of illustration only. One skilled in the art will readily recognize from the following description that alternative embodiments of the structures and methods illustrated herein is employed without departing from the principles, or benefits touted, of the disclosure described herein.

DETAILED DESCRIPTION

The techniques described herein are used for various wireless communication systems. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and other wireless communication systems of fourth generation (4G) and fifth generation (5G).

The teachings herein is incorporated into (e.g., implemented within or performed by) a variety of wireless apparatuses, generally referred to as wireless devices, mobile devices, or wireless nodes. Such wireless node may provide, for example, connectivity for or to a network (e.g., a wide area network such as the Internet or a cellular network) via a wired or wireless communication link. A wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations, an access point may comprise a set top box kiosk, a media center, or any other suitable device that is configured to communicate via a wireless or wired medium.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein is incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, or any other suitable device that is configured to communicate via a wireless or wired medium. The implementation in such cases is in the form of a dedicated circuit (e.g., ASIC), or installed code executing on a processor. In embodiments of devices such as smartphones, the implementation may take the form of a software application that is downloaded from a host server and installed onto the node device and executed therein to enable the device to provide the mesh forwarding and connection between multiple node devices.

Disclosed embodiments include methods and systems by which unattached mobile devices that do not have connectivity to a network (e.g., cellular network, satellite network, Internet network) can still communicate by sending and receiving packets with information or data content (e.g., text messages, locations, images, etc.) through a local mesh of connected devices configured in the manner described herein.

FIG. 1 illustrates an example mesh network 100 comprising a plurality of communicating devices or wireless nodes 102 where various embodiments of the present disclosure are implemented. The wireless nodes 102 may form mesh links 104 with one another, over which mesh paths are established using a certain routing protocol. Examples of mesh routing protocols may include, for example, Hybrid Wireless Mesh Protocol (HWMP), Ad-hoc On-demand Distance Vector Protocol (AODV), Optimized Link State Routing (OLSR), and/or other routing protocols. A mesh link 104 is shared by two wireless nodes 102 which may directly communicate with each other via a wireless medium or a wireless communication channel. In accordance with embodiments of the present disclosure, a plurality of wireless nodes 102 connected through the mesh links 104 may form the mesh network 100 when any other type of communication between the wireless nodes 102 is not available. It should be understood that all wireless nodes 102 in the mesh network 100 are "peer" nodes. Thus, each wireless node 102 in the mesh network 100 can be either the intended recipient of a packet or a re-transmitter of the packet.

As illustrated in FIG. 1, stations (STAs) or wireless devices 106 and 108 that are not yet members of the mesh network 100 may lose connectivity with a wireless network 110. For example, the wireless network 110 is a cellular network, an Internet network, a satellite network or some other type of wireless network that associated in the past and connected the STAs 106 and 108. The STAs 106 and 108 can lose connectivity with the wireless network 110 when the STAs 106 and 108 are located outside a coverage region of the wireless network 110, or the wireless network 110 is not operational. Connectivity between the STAs 106 and 108 can be re-established by establishing new connections 112 and 114, respectively with wireless nodes 102 of the mesh network 100, as illustrated in FIG. 1. After that, the STAs 106 and 108 communicates between each other through a mesh of mutually connected wireless nodes 102, i.e., through the mesh network 100. Before joining the mesh network 100, each of the STAs 106 and 108 goes through a process of discovering wireless nodes 102 that are within the wireless range of that STA. For example, each wireless node 102 of the mesh network 100 may scan its wireless range for beacons that are periodically transmitted from the STAs 106 and 108. Once each of the STAs 106 and 108 is discovered by at least one wireless node 102 of the mesh network 100, the STAs 106 and 108 join the mesh network 100 and communicate between each other through one or more wireless nodes 102 of the mesh network 100. This process of discovering a neighboring device and joining the mesh network 100 is used any time a wireless device loses connectivity to the wireless network 110.

Figure 2:
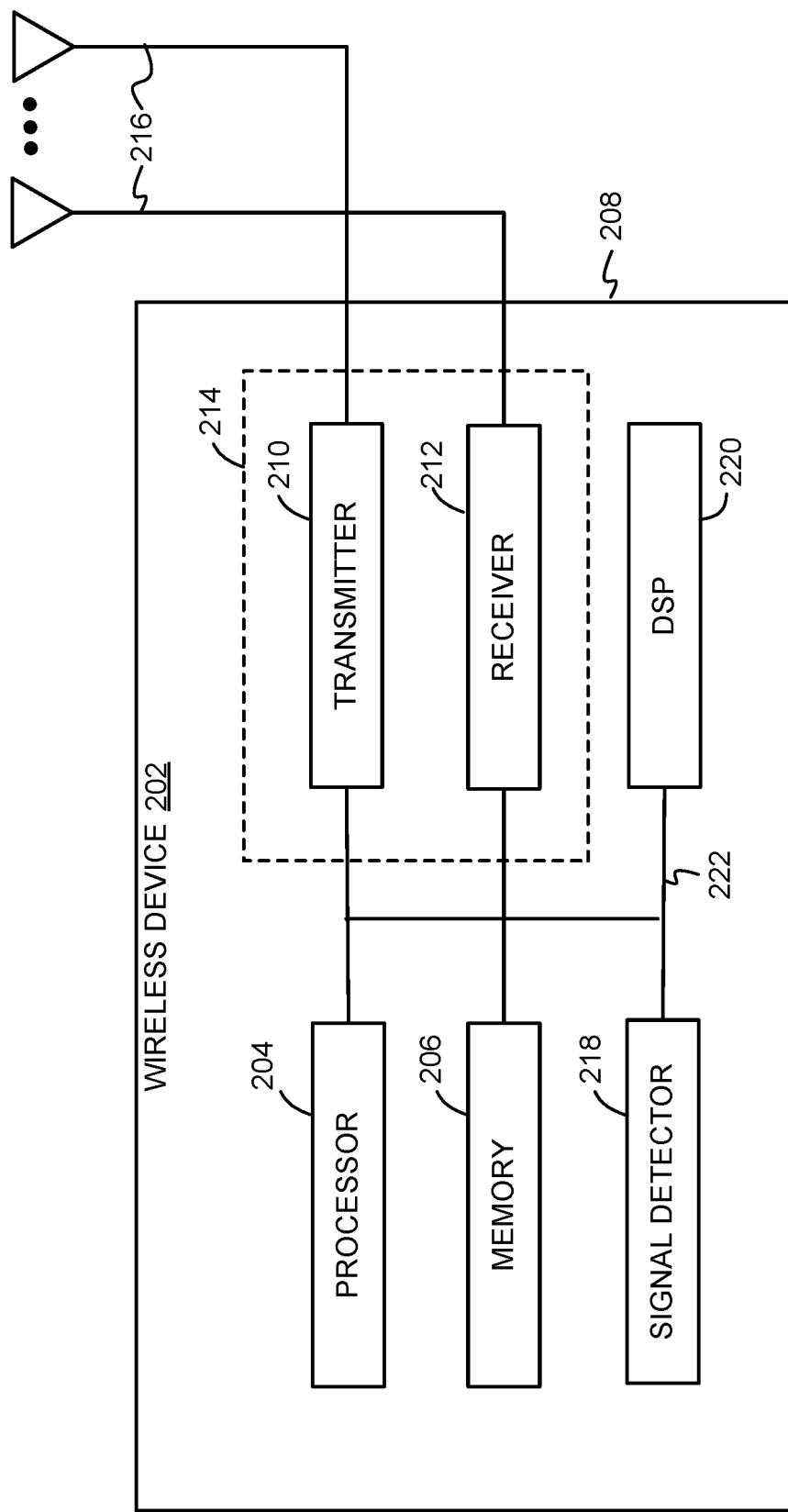
FIG. 2 is a block diagram of an example wireless device that is employed in the mesh network shown in FIG. 1, in accordance with embodiments of the present disclosure.

FIG. 2 illustrates various components that may be utilized in a wireless device 202 that is employed within the mesh network 100 shown in FIG. 1. The wireless device 202 is an example of a device that is configured to implement the various methods described herein. The wireless device 202 may be a wireless node 102 of the mesh network 100.

The wireless device 202 includes a processor 204 which controls operation of the wireless device 202. The processor 204 can also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 are executable to implement the methods described herein.

The wireless device 202 also includes a housing 208 that includes a transmitter 210 and a receiver 212 to allow transmission and reception of data between the wireless device 202 and another wireless node (e.g., another wireless node in a remote location). The transmitter 210 and receiver 212 are combined into a transceiver 214. One or more antennas 216 are attached to the housing 208 and electrically coupled to the transceiver 214. The wireless device 202 may also include (not shown) multiple transmitters, multiple receivers, and multiple transceivers.

The wireless device 202 also includes a signal detector 218 that detects and quantifies the level of signals received by the transceiver 214. The signal detector 218 quantifies detection of such signals using total energy, energy per subcarrier per symbol, power spectral density and/or other quantification metrics. The wireless device 202 also includes a digital signal processor (DSP) 220 for use in processing signals.

The various components of the wireless device 202 are coupled by a bus system 222, which may include a power bus, a control signal bus, and a status signal bus in addition to a data bus.

Figure 3:
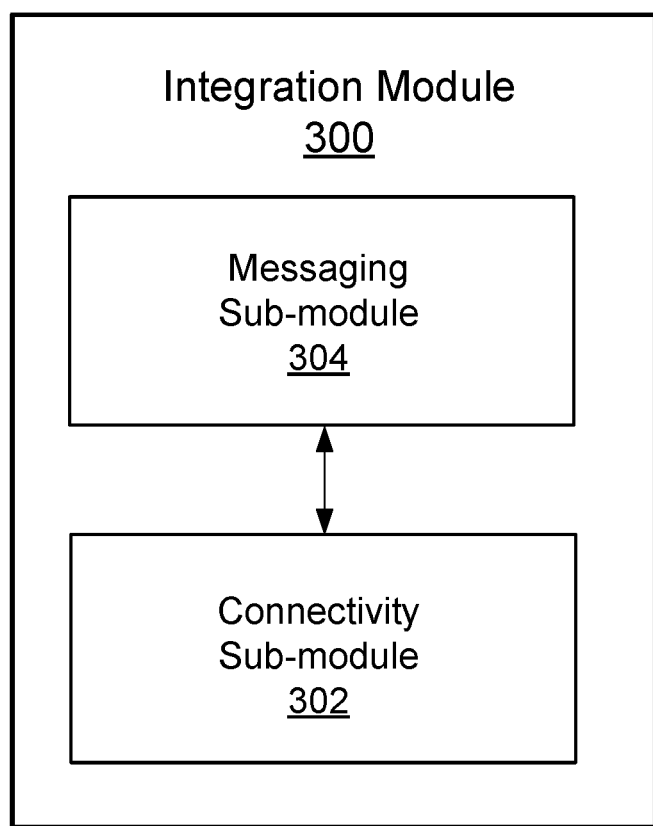
FIG. 3 is an example block diagram of an Integration module that is implemented within the wireless device shown in FIG. 2 for performing wireless communication with other wireless devices of the mesh network shown in FIG. 1, in accordance with embodiments of the present disclosure.

FIG. 3 illustrates an example block diagram of an Integration module 300 that is implemented within the wireless device 202 shown in FIG. 2 for performing wireless communication with one or more other wireless devices of the mesh network 100 shown in FIG. 1, in accordance with embodiments of the present disclosure. The Integration module 300 is an embodiment of the processor 204 of the wireless device 202. As illustrated in FIG. 3, the Integration module 300 comprises a lower-level Connectivity sub-module 302 and a higher-level Messaging sub-module 304.

The Connectivity sub-module 302 handles processes related to discovery, connection, and administration of other mobile devices (i.e., wireless nodes) within a wireless range of the wireless device comprising the Integration module 300. The Connectivity sub-module 302 can utilize different types of antennas, e.g., Bluetooth and Wi-Fi antennas. The Connectivity sub-module 302 provides support for different types of multicast interfaces, e.g., Wifi-Direct and/or Access-Point multicast interfaces.

The Connectivity sub-module 302 performs a process of discovering nearby mobile devices. The device discovery is a process through which nearby mobile devices within reach (e.g., up to approximately 50 m) are found, identified and reported to one or more users. The device discovery may be performed on one or more supported interfaces, based on which interface or a group of interfaces are activated by the Connectivity sub-module 302. Each mobile device being discovered may be reported along with an interface used to discover that nearby mobile device.

The Connectivity sub-module 302 establishes duration of discovery intervals of one or more nearby mobile devices. The Connectivity sub-module 302 defines a duration of each connection with a nearby mobile device. The Connectivity sub-module 302 may also define an expiration time of each packet to be forwarded to the one or more nearby mobile devices. The Connectivity sub-module 302 discovers at least one nearby mobile device based on receiving a beacon signal from the at least one nearby mobile device. Upon reception of at least one beacon signal, the Connectivity sub-module 302 stores an identifier of the at least one discovered nearby mobile device in a list of mobile devices.

In order to correctly connect with a nearby mobile device, a connection request may be triggered and sent from either the Messaging sub-module 304 or from the Connectivity sub-module 302. If the connection is successfully established, an event can be reported to the one or more users, and a connection session object may be created. A connection with a discovered nearby mobile device may be requested, e.g., a pre-configured numbers of retries. A controller (not shown in FIG. 3) may verify that the Connectivity sub-module 302 has compiled information used for creating a complete connection session object. After that, connection information may be exchanged though the handshake process between the wireless device 202 having the Integration module 300 and a discovered nearby mobile device.

The Messaging sub-module 304 is coupled to the Connectivity sub-module 302 and starts operating when connections have been successfully established (e.g., through the Connectivity sub-module 302). The Messaging sub-module 304 handles all outgoing and incoming requests both for direct communication between wireless nodes and for mesh forwarding. The Messaging sub-module 304 allows sending of different types of data that can be communicated between mobile devices, such as text, an image, location information, voice content, or some other data content.

The Messaging sub-module 304 may generate a data packet having a structure that facilitates the scalability and flexibility of a communication system. The packet typically has a structure that comprises: content of the packet, a unique identifier of a final recipient of the packet, a unique identifier of a sender of the packet, a type of the packet (e.g., text, location, image, etc.), a time and date the packet was sent, or a cyclic redundancy check (CRC), e.g., for a local public key or a recipient's public key. The content of the packet is a byte array representing text, location, or binary data (e.g., files or images). The packet may also include a name of a file if the content of the packet is the file. It should be understood that one or more additional fields can be included into the structure of the packet The Messaging sub-module 304 handles several follow-up signals received as a response of a packet reception. The follow-up signals act as acknowledgments for having the packet sent, received and read. For example, an acknowledgement signal is triggered when a recipient receives the sent packet. The Messaging sub-module 304 marks the packet as being received based on reception of the acknowledgement signal from the recipient. A blocked acknowledgement signal is triggered when the recipient receives the sent packet, but the sender is blocked by the recipient. A read acknowledgement signal is optionally sent as an acknowledgement that the conversation between the sender and the recipient has been displayed or "read" (e.g., the conversation window was opened) by the recipient.

Once a packet is set to be sent, the Messaging sub-module 304 puts the packet in a queue along with any other packets produced at that time slot. The Messaging sub-module 304 can manage the queue of packets by sending each packet in the queue in a separate time slot or by sending the packets in the queue in the batch mode, i.e., during a same time slot. The Messaging sub-module 304 may immediately process the queue in an asynchronous thread to secure that packets are delivered in the same order as they were produced.

In order to process the queue, the Connectivity sub-module 302 determines if there is an active connection session with a recipient device. If the active connection session is established, the Messaging sub-module 304 initiates sending at least one packet from the queue to the recipient device using the established connection session. Otherwise, the Connectivity sub-module 302 may request a new connection session to be established with the recipient device. Once a new connection session is established with the recipient device, the Messaging sub-module 304 initiates sending at least one packet from the queue to the recipient device. Once a packet has been sent, the Messaging sub-module 304 triggers a notification. On the recipient's side, once a packet is received, any or all of the acknowledgement signals described above may be returned as a response to the sender. Sometimes, packets cannot be delivered successfully due to a connection error or recipient's sudden unavailability. In this case, the Messaging sub-module 304 triggers generating a specific error message describing why the packets cannot be delivered successfully.

Figure 4:
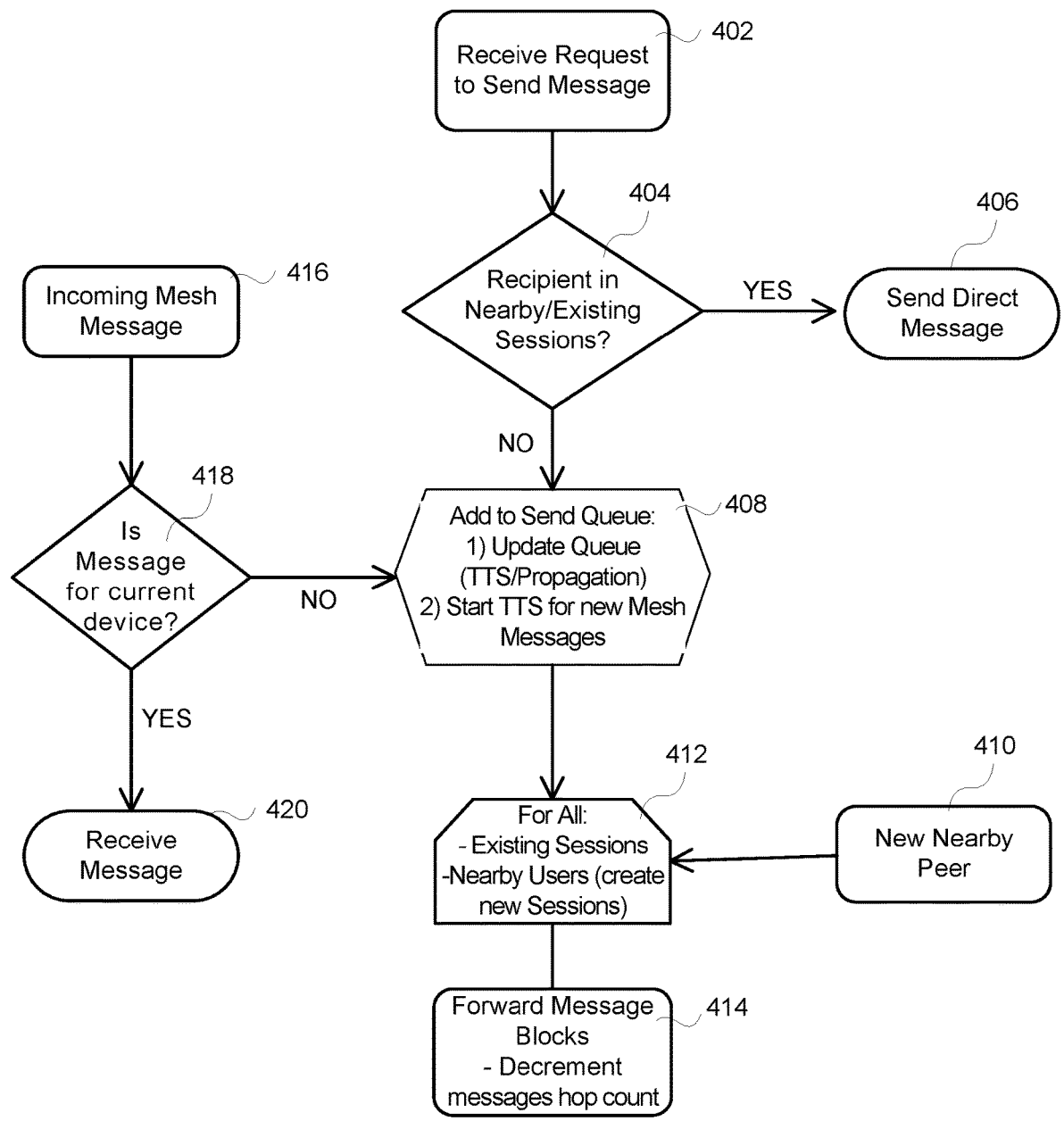
FIG. 4 is a flow chart illustrating a method for mesh forwarding that is implemented at the Integration module shown in FIG. 3, in accordance with embodiments of the present disclosure.

FIG. 4 is a flow chart illustrating a method 400 for mesh forwarding that is implemented at the Messaging sub-module 304 in communication with the Connectivity sub-module 302 of the Integration module 300 shown in FIG. 3, in accordance with embodiments of the present disclosure. The method 400 for mesh forwarding illustrated in FIG. 4 is implemented at a wireless node 102 of the mesh network 100 shown in FIG. 1 and at the wireless device 202 shown in FIG. 2, for example in a software application that is downloaded and installed onto the wireless node 102 and onto the wireless device 202.

The method 400 begins by the wireless node 102 receiving 402 a request to send a packet comprising information or data from another wireless node. In some embodiments, the request to send the packet is initiated and obtained via the Messaging sub-module 304. The packet requested to be sent includes an identifier of a recipient device of the packet (e.g., any wireless node 102 of the mesh network 100), such as user identifier (e.g., a user name). The packet is of a broadcast type, or the packet is a unicast packet to be directly communicated between a pair of wireless nodes 102 of the mesh network 100. The unicast packet may include a direct message that is sent from the wireless node 102 to another wireless node 102 of the mesh network 100. The direct message is private and only the intendent receiver device can read the received direct message. The broadcast packet may include a broadcast message that is sent from the wireless node 102 to all nearby wireless nodes, regardless of whether the nearby wireless nodes are associated with known users or not. The broadcast message is typically not encrypted.

The Messaging sub-module 304 determines 404, based on the identifier of the recipient device, whether the recipient device is one of mobile devices within the wireless range of the wireless node 102, i.e., whether the recipient device of the packet belong to a list of mobile devices maintained by the wireless node 102. The list of mobile devices is maintained by the wireless node 102 based on determining presence of at least one new mobile device within the wireless range of the wireless node 102. The wireless node 102 updates the list of mobile devices based on the determined presence of mobile devices within the wireless range of the wireless node 102 by including identifiers of the mobile devices and identifiers of respective users associated with the mobile devices. The presence of new mobile devices within the wireless range of the wireless node 102 can be determined based on detecting beacons or other notification signals of the mobile devices. The wireless node 102 has already established one or more sessions (or connections) with one or more mobile devices within the wireless range of the wireless node 102. Furthermore, the wireless node 102 may establish, before forwarding the packet, at least one new session (connection) with at least one newly discovered mobile device within the wireless range of the wireless node 102.

If the intended recipient device of the packet is included in the list of mobile devices maintained at the wireless node 102, then the Messaging sub-module 304 directly sends 406 the packet to the intended recipient device. If the direct transmission 406 of the packet fails, the Messaging sub-module 304 includes the packet in an outgoing queue and forwards the packet to mobile devices (including the intended recipient device) specified within the outgoing queue. The outgoing queue comprises a list of packets of a same structure waiting to be retransmitted (forwarded) through the mesh mechanism. The Messaging sub-module 304 determines a size of the outgoing queue, and discards at least one packet from the outgoing queue if the size of the outgoing queue is larger than a defined maximum queue size.

If the recipient device of the packet is not in the list of mobile devices, i.e., if the recipient device is not within the wireless range of the wireless node 102 performing operations of the mesh forwarding method 400, then the Messaging sub-module 304 adds 408 the packet into the outgoing queue. The outgoing queue comprises a list of packets waiting to be retransmitted (forwarded) from the wireless node 102 to the mobile devices within the wireless range of the wireless node 102. For each packet in the outgoing queue, the Messaging sub-module 304 allocates a transmission time slot (TTS) and sets an indication about a number of mobile devices to which that packet is to be propagated based on a number of mobile devices in the list of mobile devices. The Messaging sub-module 304 starts TTS for each new packet that is within the outgoing queue and ready to be forwarded to one or more mobile devices within the wireless range of the wireless node 102.

The wireless node 102 detects 410 one or more new peer nodes (i.e., mobile devices) based on presence signaling of the peer node(s) in the range of the wireless node 102 performing operations of the mesh forwarding method 400. After that, the Connectivity sub-module 302 establishes 412 sessions (connections) with the newly detected peer nodes. The Messaging sub-module 304 includes identifiers of the peer nodes detected 410 in the list of mobile devices in order to determine whether the intended recipient device of the packet is one of the mobile devices within the wireless range of the wireless node 102. In addition, the Connectivity sub-module 302 maintains 412 existing connection sessions with one or more wireless devices in the list of wireless devices. The Connectivity sub-module 302 transmits a request for connection with a mobile device within the wireless range of the wireless node 102. The Connectivity sub-module 302 receives a hand-shake message transmitted from the mobile device in response to the request, wherein the hand-shake message comprises a unique identifier of the mobile device. The Connectivity sub-module 302 creates a connection session with the mobile device based on the received handshake message. The Messaging sub-module 304 includes in the packet one or more identifiers of the one or more mobile devices where the packet is being forwarded and an identifier of the wireless node 102 forwarding the packet. The Messaging sub-module 304 also includes in the packet an indication about a number of times the packet is forwarded from the wireless node 102.

The Messaging sub-module 304 forwards 414 one or more packets from the outgoing queue to the one or more mobile devices within the wireless range of the wireless node 102 via the established connection sessions. Before the forwarding 414, the Messaging sub-module 304 divides the one or more packets from the outgoing queue into a plurality of blocks of a defined size, and the wireless node 102 transmits the plurality of blocks to the one or more mobile devices within the wireless range of the wireless node 102. In general, a block structure used for packet transmission is based on a defined operator, i.e., based on a connection interface between a pair of communicating wireless nodes, which can be defined in the Connectivity sub-module 302 or the Messaging sub-module 304. Each block of the plurality of blocks comprises an optional position flag (PF), a chunk identifier (CI) and data. PF can be either a start flag (SF) indicating that the block is a first block in a packet or an end flag (EF) indicating that the block is a last block in the packet. CI indicates a type of the block, such as a data type or a dictionary type. Data included in the block may comprise an array of bytes of information.

The Messaging sub-module 304 generates a package that encapsulates the packet. Each packet in the outgoing queue is encapsulated within a corresponding package. Once the Messaging sub-module 304 includes the packet in the outgoing queue and the packet is ready for forwarding 414, the Messaging sub-module 304 decrements a value in the package that indicates a remaining number of hops associated with the packet, i.e., a remaining number of times the packet can be forwarded from one wireless node to another before being discarded.

The Messaging sub-module 304 of the wireless node 102 may discard the packet reaching the wireless node 102 if the packet was transferred from one wireless node to another before reaching the wireless node 102 a number of times equal to a predefined maximum allowed number of times. The Messaging sub-module 304 may also discard the packet reaching the wireless node 102 if the packet has been already forwarded by the wireless node 102 a predefined maximum number of times, i.e., if a predefined propagation limit has been reached. The Messaging sub-module 304 may also discard the packet if an expiration time of the packet indicated in the packet is reached or if a reach packet is received at the wireless node 102 that indicates the packet has reached its destination. The Messaging sub-module 304 compares, with the list of mobile devices, at least one identifier included in the packet of at least one mobile device to which the packet was previously delivered. After that, the Messaging sub-module 304 excludes the at least one mobile device from the list of mobile devices to which the packet will be forwarded, if the at least one identifier is found in the list of mobile devices. It should be also noted that the Messaging sub-module 304 can automatically switch operation of the wireless node 102 between directly sending a packet to a final recipient of the packet and forwarding the one or more packets to the one or more mobile devices within the wireless range of the wireless node 102.

The wireless node 102 performing operations of the method 400 for mesh forwarding receives 416 (e.g., from a wireless node 102 within the wireless range of the wireless node 102) an incoming packet (mesh message) from a user associated with other wireless node 102. The incoming packet received by the wireless node 102 comprises another identifier of another intended recipient device of the incoming packet.

The Messaging sub-module 304 of the wireless node 102 determines 418, based on the other identifier, whether the other intended recipient device of the incoming packet is different from the wireless node 102. If the other intended recipient device is different from the wireless node 102 (i.e., the wireless node 102 that received the incoming packet is not an intended recipient device of the incoming packet), the Messaging sub-module 304 adds 408 the incoming packet to the outgoing queue. The Messaging sub-module 304 discards the incoming packet after reaching an expiration time indicated in the incoming packet, if the list of mobile devices is empty and no connection is established with any mobile device within the wireless range of the wireless node 102. The Messaging sub-module 304 may determine that the incoming packet is intended to the wireless node 102 performing operations of the method 400 for mesh forwarding. Then, the wireless node 102 receives 420 a message encapsulated into the incoming packet. After that, the wireless node 102 directly sends a reach packet to the mobile devices within the wireless range of the wireless node 102 informing the mobile devices that the packet is successfully received at the indented recipient device and that the mobile devices should stop forwarding the received packet.

Figure 5:
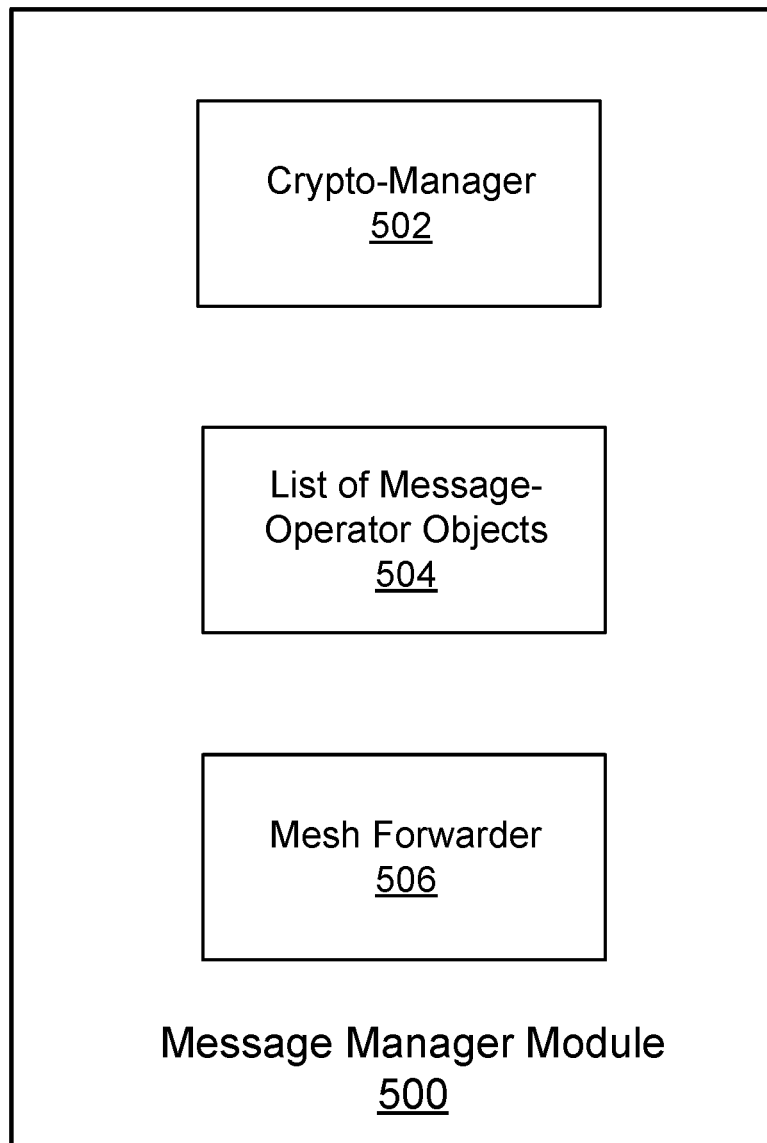
FIG. 5 is an example block diagram of a Message Manager module that is implemented within the wireless device shown in FIG. 2 for performing wireless communication with other wireless devices of the mesh network shown in FIG. 1, in accordance with embodiments of the present disclosure.

FIG. 5 illustrates an example block diagram of a Message Manager module 500 that is implemented within the wireless device 202 shown in FIG. 2 for performing wireless communication with one or more other wireless devices of the mesh network 100 shown in FIG. 1, in accordance with embodiments of the present disclosure. The Message Manager module 500 is an embodiment of the processor 204 of the wireless device 202. As illustrated in FIG. 5, the Message Manager module 500 includes a Crypto-Manager sub-module 502, a List of Message-Operator Objects sub-module 504 and a Mesh Forwarder sub-module 506.

The Crypto-Manager sub-module 502 performs encryption and decryption of packets communicated between wireless nodes of the mesh network. The Crypto-Manager sub-module 502 generates private and public keys of the mesh network users. To encrypt a packet (data message) for a mesh network user, the Crypto-Manager sub-module 502 may first obtain a public key and a unique user identifier (UUID) for the user, e.g., through the handshake process. The Crypto-Manager sub-module 502 encrypts the packet by using the UUID of the receiving user. The Crypto-Manager sub-module 502 decrypts a packet being received based on a local key pair, i.e., based in part on an encryption key of a device sending the packet. The Crypto-Manager sub-module 502 can further generate a CRC validation for a local public key or other encryption key of a user. The CRC can be used by other components to verify if an encryption key being used is correct and updated.

The List of Message-Operator Objects sub-module 504 comprises a list of Message Operator objects, wherein each Message Operator object is configured to send and receive information using a determined connection interface with a device within a wireless range of the wireless device 202 having the Message Manager Module 500. Each Message Operator object from the list controls one type of node connection, and encapsulates all implementation details utilized by the Message Manager module 500. Each Message Operator object implements an interface known by the Message Manager module 500, so all Message Operator objects can be handled in the same manner. In an embodiment, one type of node connection controlled by the List of Message-Operator Objects sub-module 504 comprises a Bluetooth Low Energy (BLE) based connection. BLE is a version of the standard Bluetooth connection with low energy consumption. Other types of connections between wireless nodes of a local mesh can be also defined and controlled by the List of Message-Operator Objects sub-module 504.

The Mesh Forwarder sub-module 506 of the Message Manager module 500 performs a mesh forwarding process. The Mesh Forwarder sub-module 506 operates on packets that cannot be directly delivered from one wireless node to another, and utilizes a broadcast algorithm with wireless nodes within the wireless range. The Mesh Forwarder sub-module 506 is configured to deliver one or more packets to one or more devices within the wireless range of the wireless device 202, wherein the one or more packets are dedicated to one or more recipients that are not within the wireless range of the wireless device 202. The Mesh Forwarder sub-module 506 attempts sending a packet encapsulating the information to a wireless node using a type of connection interface controlled by the List of Message-Operator Objects sub-module 504.

The Mesh Forwarder sub-module 506 obtains a packet that encapsulates information content. The Mesh Forwarder sub-module 506 then determines whether the packet is dedicated to the wireless device 202 or to be delivered to one or more peer nodes within the wireless range of the wireless device 202. The Mesh Forwarder sub-module 506 also determines whether the packet is expired or not. If the packet is to be delivered to the one or more peer nodes and the packet is not expired, the Mesh Forwarder sub-module 506 includes the packet into a mesh forwarding list comprising a plurality of packets of a same structure for forwarding to the one or more peer nodes. The Mesh Forwarder sub-module 506 may receive notification, e.g., from the List of Message-Operator Objects sub-module 504, about at least one new connection to the one or more peer nodes. The Mesh Forwarder sub-module 506 checks, in each packet within the mesh forwarding list, a list with at least one identifier of at least one wireless device that received the packet in the past. The Mesh Forwarder sub-module 506 then forwards the mesh forwarding list to the one or more peer nodes via the at least one new connection, based on the checked one or more identifiers.

FIG. 6 is a flow chart illustrating a method 600 for mesh forwarding that is implemented at the Mesh Forwarder sub-module 506 shown in FIG. 5 in communication with other portions of the Message Manager module 500, in accordance with embodiments of the present disclosure. The method 600 for mesh forwarding illustrated in FIG. 6 is implemented at a wireless node 102 of the mesh network 100 shown in FIG. 1 and at the wireless device 202 shown in FIG. 2, for example in a software application that is downloaded and installed onto the wireless node 102 and onto the wireless device 202.

Operations of the method 600 begin by receiving 602 a packet that encapsulates information or data (e.g., text message, location, image, etc.). In one or more embodiments, the packet with the encapsulated information is provided to the Mesh Forwarder sub-module 506 by the Message Manager module 500, and the packet may originate from the wireless node 102. Alternatively, the packet may not originate from the wireless node 102. Instead, the packet with the encapsulated information is received from a peer node within the range of the wireless node 102, such as from some other wireless node 102 in the mesh network 100.

A structure of the packet comprises at least one of: a unique identifier of the packet, an indication about a type of the packet, information for decryption of the packet at the one or more peer nodes, an identifier of a sender device where the information content originates, an identifier of an intended recipient device of the information content, information about a remaining number of times the information content is allowed to be transferred from one node to another, information about expiration of the packet, an array of at least one element identifying at least one peer node that has received the information content, or information about a number of peer nodes within the wireless range of the wireless device 202 to which the packet is forwarded. It should be understood that one or more additional fields can be included into the structure of the packet. Before transmission of the packet, the Mesh Forwarder sub-module 506 updates the information about the remaining number of times the packet is allowed to be transferred from one node to another. In addition, the Mesh Forwarder sub-module 506 updates the information about the number of peer nodes within the wireless range of the wireless device 202 to which the packet is forwarded.

When the Mesh Forwarder sub-module 506 receives 602 the packet, the Mesh Forwarder sub-module 506 requests from the Message Manager module 500 to determine 604 whether the packet belongs to the wireless node 102 or the packet still needs to be forwarded to one or more peer nodes within the wireless range of the wireless node 102. The packet comprises an identifier of an intended recipient device of the information encapsulated in the packet. The Message Manager module 500 is configured to determine 604, based on the identifier of the intended recipient device, whether the packet reached its destination or the packet still needs to be forwarded to reach its intended receiver.

The Message Manager module 300 is also configured to determine 606 whether the packet has been expired. If the packet has been expired, then the Mesh Forwarder sub-module 506 discards the packet from forwarding to the one or more peer nodes within the wireless range of the wireless node 102. The packet is expired if any of the following are true: (1) an attribute 'propagation' in the packet indicating a number of peer nodes to which the packet propagates is greater than a defined propagation limit; (2) an attribute 'hops' in the packet indicating a remaining number of times the packet is allowed to be transferred from one peer node to another reaches zero value; or (3) a time elapsed since creation of the packet (an elapsed time attribute also included in the packet) is greater than a defined sharing time limit.

If the Message Manager module 500 determines (in communication with the Mesh Forwarder sub-module 506) that the packet still needs to be forwarded to nearby peer node(s) and the packet has not been expired, the Mesh Forwarder sub-module 506 includes 608 the packet into a mesh forwarding list comprising a plurality of packets of a same structure for forwarding to the one or more peer nodes. The Mesh Forwarder sub-module 506 determines whether a number of packets in the mesh forwarding list reaches a defined maximum mesh capacity. If the number of packets reaches the defined maximum mesh capacity, the Mesh Forwarder sub-module 506 discards at least one packet from the mesh forwarding list (e.g., the oldest packet among the packets in the mesh forwarding list), before adding any new packet to the mesh forwarding list.

The Mesh Forwarder sub-module 506 receives 610 notification from the Message Manager module 500 about at least one new connection established between the wireless node 102 and the one or more peer nodes. The Message Manager module 500 stores information about established connection(s) between the wireless node 102 and the one or more peer nodes in the List of Message-Operator Objects sub-module 504. In one embodiment, the List of Message-Operator Objects sub-module 504 can be configured to control a BLE based connection between the wireless node 102 and the one or more peer nodes. In general, the List of Message-Operator Objects sub-module 504 can be configured to control different types of connections between the wireless node 102 and the one or more peer nodes.

Before forwarding packets in the mesh forwarding list, the Mesh Forwarder sub-module 506 checks 612 each packet of the mesh forwarding list to determine at least one identifier of at least one peer node that has already received that packet. If the Mesh Forwarder sub-module 506 determines that the packet has already been received by at least one peer node within the wireless range of the wireless node 102, the Mesh Forwarder sub-module 506 is configured to avoid transmission of the packet to the least one peer node within its range. The Mesh Forwarder sub-module 506 discards the packet from the mesh forwarding list when transmitting the mesh forwarding list to the at least one peer node that has already received the packet. Otherwise, Mesh Forwarder sub-module 506 includes identifiers of all peer nodes within the wireless range of the wireless node 102 in a track list of the packet, before forwarding the packet within the mesh forwarding list to the one or more peer nodes within the track list.

The Mesh Forwarder sub-module 506 is configured to forward 614 the mesh forwarding list with the plurality of packets to the one or more peer nodes within the wireless range of the wireless node 102 via the at least one established connection. Before forwarding the mesh forwarding list, the Mesh Forwarder sub-module 506 determines whether the one or more peer nodes scheduled to receive the mesh forwarding list have received before any of the forwarded packets.

In some embodiments, the Mesh Forwarder sub-module 506 initiates transmitting a reach packet to the one or more peer nodes to stop forwarding the packet, if the packet is dedicated to the wireless node 102. The reach packet may comprise an identifier of the information content encapsulated in the packet. The wireless node 102 may receive a reach packet indicating to stop forwarding the packet. The Mesh Forwarder sub-module 506 may then discard the packet from the mesh forwarding list based on the received reach packet.

After establishing connection between a pair of peer nodes (e.g., between the wireless node 102 and one of the peer nodes within the wireless range of the wireless node 102), a handshake process is performed between the connected pair of peer nodes in order to exchange devices and users information to determine their identities and allow secure information sharing. The handshake process represents a session of questions and answers between two peer nodes that want to communicate.

A first peer node creates an initial request and sends the initial request to a second node. The second peer node creates a first response from the received request. The second peer node also creates a first request for the first peer node. The second peer node then sends the first request and the first response to the first peer node. Upon reception, the first peer node processes the first response and creates a second request if necessary. The first peer node also creates a second response based on the received first request. The first peer node then sends the second response and the optional second request to the second peer node. Upon reception, the second peer node processes the second response and a third request is created when necessary. A third response, if necessary, is also created from the received second request. This handshake process continues until both peer nodes obtain all requested information from each other. The handshake process may be initiated by a peer node having a central role in communicating, using, e.g., BLE connection, with other peer nodes. Alternatively, the handshake process may be initiated by a peer node having a largest CRC of both peer nodes.

A request represents a petition for required information from other peer node. The request includes a first field with a type of request being processed and a second field for sending an encryption key's 32-bit CRC obtained from the other peer node. There are three different types of requests that can be sent. A first type of request is "general" type, which is used to ask the other peer node for all of its information as the other peer node was not previously registered in the local database. A send type of request is "key" type, which is used to solicit the other peer node for its public key with which messages will be encrypted. A third type of request is "confirmation" type, which is used when the other peer node's encryption key is obtained, but it is not known if that encryption key is still valid.

A response comprises information that was solicited by the other peer node. The response includes a first field indicating a response type, a second field indicating a session username, a third field indicating a country associated with a user of the other peer node, and a fourth field that contains a key used to encrypt messages. There are three different types of responses that can be sent. A first type of response is "general" type, which is a response to a request of "general" type. A second type of response is "key" type, which is a response to a request of "key" type. A third type of response is "confirmation" type, which is used when a validation request of the encryption key has been received and the encryption key is correct.

Figure 7:
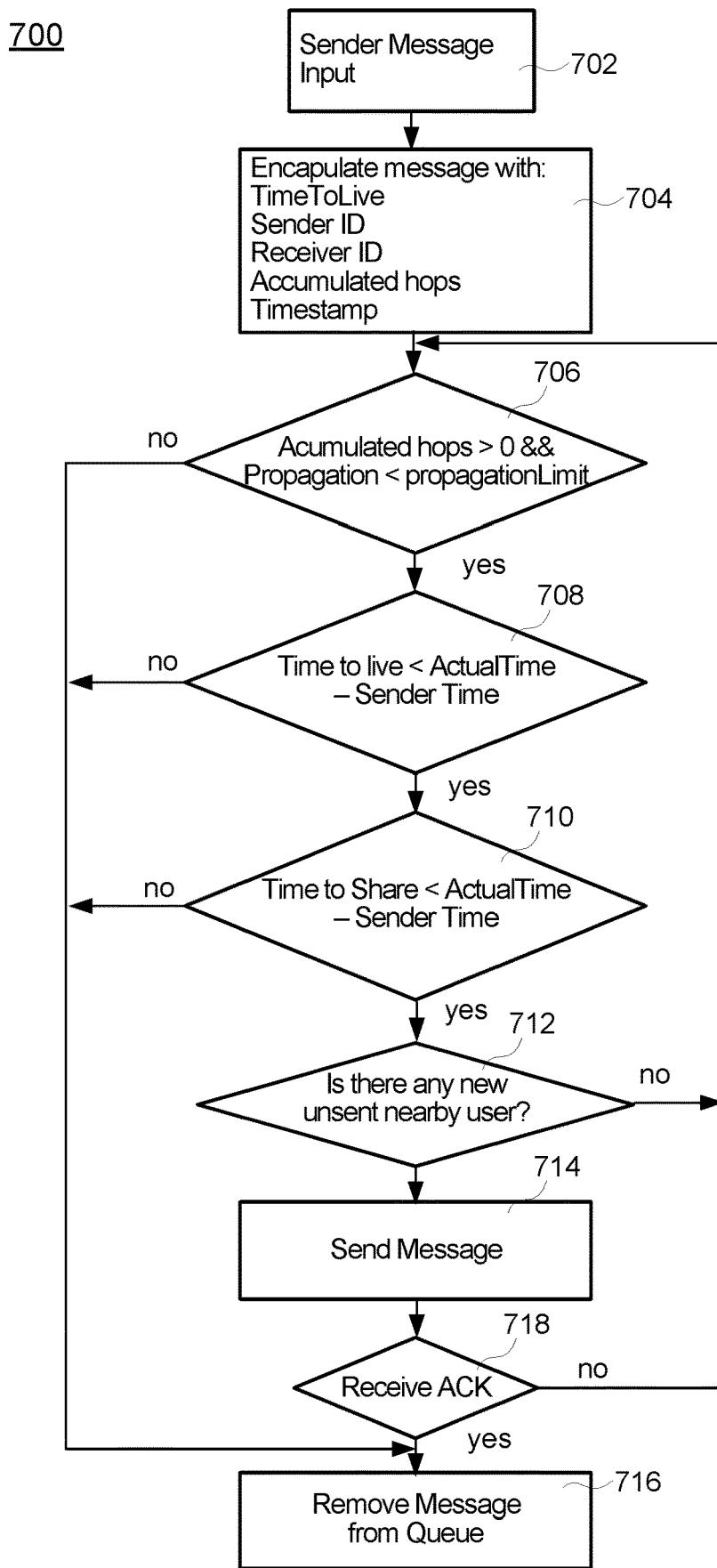
FIG. 7 is a flow chart illustrating a method of sending a mesh packet that is implemented at the Message Manager module shown in FIG. 5, in accordance with embodiments of the present disclosure.

FIG. 7 is a flow chart illustrating a method 700 of sending a packet that is implemented at the Mesh Forwarder sub-module 506 in communication with the Message Manager module 500 shown in FIG. 5, in accordance with embodiments of the present disclosure. The method 700 for sending the packet is implemented at a wireless node 102 of the mesh network 100 shown in FIG. 1 and at the wireless device 202 shown in FIG. 2, for example in a software application that is downloaded and installed onto the wireless node 102 and onto the wireless device 202.

Operations of the method 700 begin by receiving 702 information or data content (e.g., a sender message) from the Message Manager module 500, and the information content may originate from the wireless node 102, i.e., a sender device.

The Message Manager module 500 encapsulates 704 the information content into a packet that comprises following attributes: 'Time-To-Live' indicating an elapse time of the packet (e.g., in seconds), 'Sender ID' indicating a unique identifier of the sender device, 'Receiver ID' indicating a unique identifier of an intended receiver device of the packet and the packet, 'Accumulated hops' indicating a remaining number of times the packet is allowed to be transferred from one device to another, and 'Timestamp' indicating a creation time of the packet. Some additional attributes may be also included in the packet.

If the Mesh Forwarder sub-module 506 determines 706 that 'Accumulated hops' is greater than zero and propagation attribute of the packet is less than a defined 'Propagation Limit', if the Mesh Forwarder sub-module 506 determines 708 that 'Time-To-Live' is less than a defined elapsed time, i.e., Actual Time−Sender Time (equal to 'Timestamp'), if the Mesh Forwarder sub-module 506 determines 710 that a time for sharing the packet (which is also included as an attribute into the packet) has not been elapsed, and if the Mesh Forwarder sub-module 506 determines 712 that there is at least one new peer node that has not received the packet with the encapsulated information content, the Mesh Forwarder sub-module 506 is configured to send 714 the packet with the encapsulated information content to one or more peer nodes within the wireless range of the wireless node 102.

If the Mesh Forwarder sub-module 506 determines 706 that Accumulated hops' is equal to zero and the defined Propagation Limit of the packet has been reached or exceeded, if the Mesh Forwarder sub-module 506 determines 708 that 'Time-To-Live' of the packet has been elapsed, or if the Mesh Forwarder sub-module 506 determines 710 that the time for sharing the packet has been elapsed, the Mesh Forwarder sub-module 506 removes 716 the packet from a mesh forwarding queue. If the Mesh Forwarder sub-module 506 determines 712 that there is no new peer node that has not yet received the packet with the encapsulated information content, then the Mesh Forwarder sub-module 506 blocks forwarding of the packet, and Mesh Forwarder sub-module 506 keeps the packet in the mesh forwarding queue. The Mesh Forwarder sub-module 506 keeps the packet in the mesh forwarding queue until the wireless node 102 (i.e., the sender device) detects presence of a new peer node that has not yet received the packet. Then, the Mesh Forwarder sub-module 506 forwards 714 the packet to the newly detected peer node. The Mesh Forwarder sub-module 506 also keeps the packet in the mesh forwarding queue until the packet elapses (e.g., by exceeding a propagation limit, by reaching a hops limit, a duration of the packet is elapsed, or a sharing time of the packet is elapsed). In this case, the Mesh Forwarder sub-module 506 removes 716 the elapsed packet from the mesh forwarding queue.

Upon sending 714 the packet with information content, the sender device (i.e., the wireless node 102) may receive an acknowledgment from a peer node about successful reception of the packet. In an embodiment, the wireless node 102 receives the acknowledgment only if the peer node is within the wireless range of the wireless node 102. If the wireless node 102 determines 718 that the acknowledgment is received, the Mesh Forwarder sub-module 506 removes 716 the packet from the mesh forwarding queue. Otherwise, if the wireless node 102 determines 718 that the acknowledgment is not received and the packet was not successfully received by the peer node, the Mesh Forwarder sub-module 506 keeps the packet encapsulating the information content in the mesh forwarding queue in order to forward the packet to the peer node again in the future.

Figure 8:
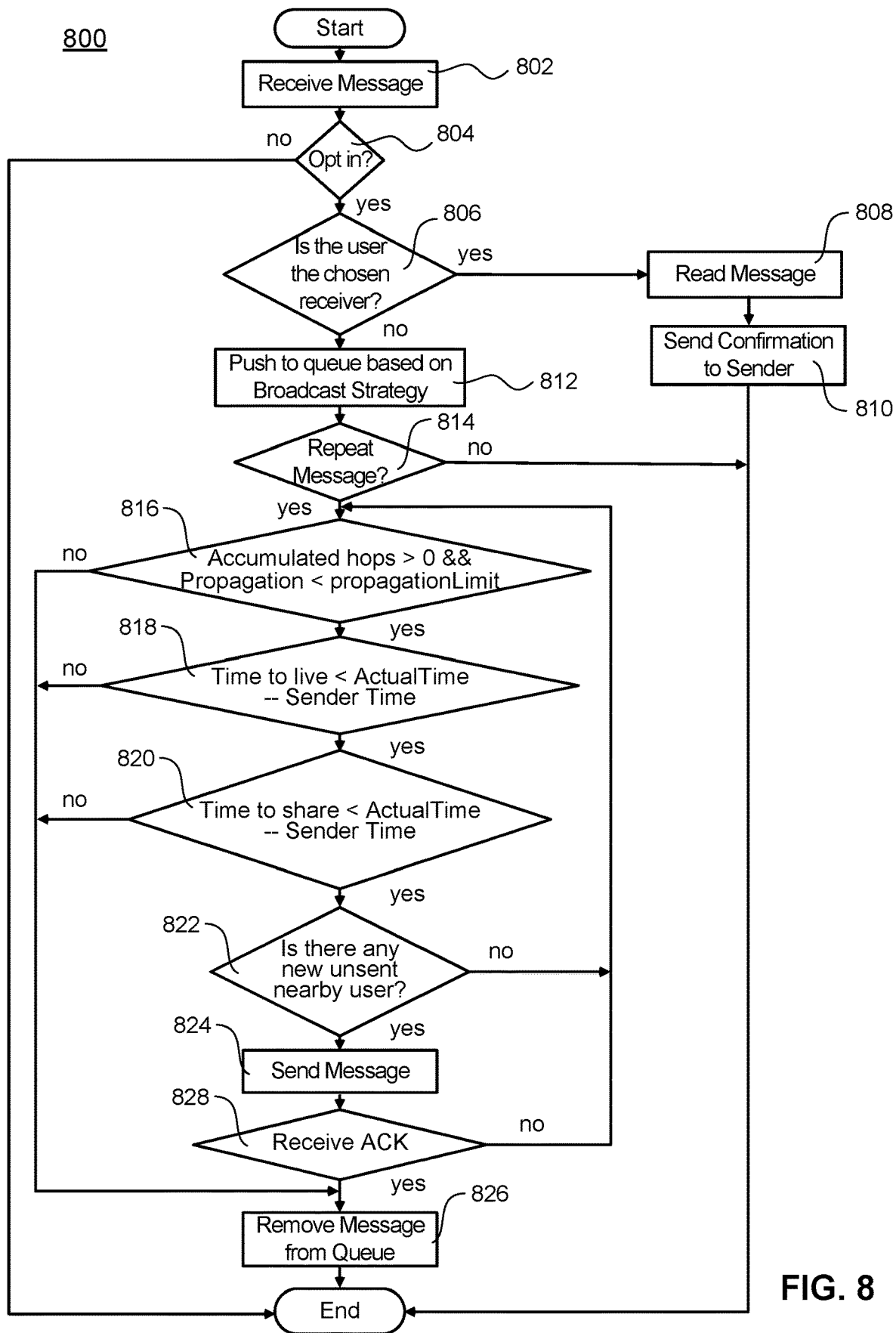
FIG. 8 is a flow chart illustrating a method of receiving a mesh packet that is implemented at the Message Manager module shown in FIG. 5, in accordance with embodiments of the present disclosure.

FIG. 8 is a flow chart illustrating a method 800 of receiving a packet that is implemented by the Mesh Forwarder sub-module 506 in communication with the Message Manager module 500 shown in FIG. 5, in accordance with embodiments of the present disclosure. The method 800 for receiving the packet is implemented at a wireless node 102 of the mesh network 100 shown in FIG. 1 and at the wireless device 202 shown in FIG. 2, for example in a software application that is downloaded and installed onto the wireless node 102 and onto the wireless device 202.

Operations of the method 800 begin by the Mesh Forwarder sub-module 506 receiving 802 an information or data content (e.g., a text message, image, location, etc.), wherein the information content is encapsulated within a packet.

In an embodiment, the Mesh Forwarder sub-module 506 may determine 804 to opt out from handling the received packet encapsulating the information content. Alternatively, the Mesh Forwarder sub-module 506 determines 804 to opt in. Then, the Message Manager module 500 determines 806, upon request from the Mesh Forwarder sub-module 506, whether the wireless node 102 that received the packet is actually an intended (chosen) receiver device of the packet.

If the Message Manager module 500 determines 806 that the wireless node 102 that received the packet encapsulating the information content is actually the intended receiver device of the packet, the Message Manager module 500 reads 808 the encapsulated information content, and the Mesh Forwarder sub-module 506 send 810 a confirmation to a sender of the information content where the information content was created. Otherwise, if the Message Manager module 500 determines 806 that the wireless node 102 that received the packet is not the intended receiver device of the packet, the Mesh Forwarder sub-module 506 pushes 812 the packet encapsulating the information content to a mesh forwarding queue for forwarding to peer nodes.

If the Mesh Forwarder sub-module 506 determines 814 that the encapsulated information content does not need to be forwarded to nearby peer(s), the Mesh Forwarder sub-module 506 discards the packet encapsulating the information content. If the Mesh Forwarder sub-module 506 determines 814 that the encapsulated information content still needs to be forwarded to nearby peer(s), the Mesh Forwarder sub-module 506 is configured to check whether the packet encapsulating the information content has been elapsed or not.

If the Mesh Forwarder sub-module 506 determines 816 that 'Accumulated hops' is greater than zero and propagation attribute of the packet is less than a defined 'Propagation Limit', if the Mesh Forwarder sub-module 506 determines 818 that 'Time-To-Live' is less than a defined elapsed time, i.e., Actual Time−Sender Time (equal to 'Timestamp'), if the Mesh Forwarder sub-module 506 determines 820 that a time for sharing the packet (which is also included as an attribute into the packet) has not been elapsed, and if the Mesh Forwarder sub-module 506 determines 822 that there is at least one new peer node that has not received the packet with the encapsulated information content, the Mesh Forwarder sub-module 506 is configured to send 824 the packet with the encapsulated information content to one or more peer nodes.

If the Mesh Forwarder sub-module 506 determines 816 that Accumulated hops' is equal to zero and the defined Propagation Limit of the packet has been reached or exceeded, if the Mesh Forwarder sub-module 506 determines 818 that 'Time-To-Live' of the packet has been elapsed, or the Mesh Forwarder sub-module 506 determines 820 that the time for sharing the packet has been elapsed, the Mesh Forwarder sub-module 506 removes 826 the packet encapsulating the information content from a mesh forwarding queue. If the Mesh Forwarder sub-module 506 determines 822 that there is no new peer node that has not yet received the packet with the encapsulated information content, the Mesh Forwarder sub-module 506 blocks forwarding of the packet, and Mesh Forwarder sub-module 506 keeps the packet in the mesh forwarding queue. The Mesh Forwarder sub-module 506 keeps the packet in the mesh forwarding queue until the wireless node 102 detects presence of a new peer node that has not yet received the packet encapsulating the information content. Then, the Mesh Forwarder sub-module 506 forwards 824 the packet to the newly detected peer node. The Mesh Forwarder sub-module 506 also keeps the packet in the mesh forwarding queue until the packet elapses (e.g., by exceeding a propagation limit, by reaching a hops limit, a duration of the packet is elapsed, or a sharing time of the packet is elapsed). In this case, the Mesh Forwarder sub-module 506 removes 826 the elapsed packet from the mesh forwarding queue.

Upon sending 824 the packet encapsulating the information content, the wireless node 102 may receive an acknowledgment from a peer node about successful reception of the packet. In an embodiment, the wireless node 102 receives the acknowledgment only if the peer node is within the wireless range of the wireless node 102. If the wireless node 102 determines 828 that the acknowledgment is received, the Mesh Forwarder sub-module 506 removes 826 the packet from the mesh forwarding queue. Otherwise, if the wireless node 102 determines 828 that the acknowledgment is not received and the packet encapsulating the information content was not successfully received by the peer node, the Mesh Forwarder sub-module 506 keeps the packet encapsulating the information content in the mesh forwarding queue in order to forward the packet to the peer node again in the future.

The various operations of methods described above are performed by any suitable means capable of performing the corresponding functions. The means may include various hardware and/or software component(s) and/or module(s), including, but not limited to a circuit, an application specific integrated circuit (ASIC), or processor.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above are performed by any suitable means capable of performing the operations, such as various hardware and/or software component(s), circuits, and/or module(s). Generally, any operations illustrated in the Figures are performed by corresponding functional means capable of performing the operations.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules are embodied in software, firmware, hardware, or any combinations thereof.

Any of the steps, operations, or processes described herein are performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Disclosed embodiments may also relate to an apparatus for performing the operations herein. This apparatus are specially constructed for the required purposes, and/or it may comprise a general-purpose computing device selectively activated or reconfigured by a computer program stored in the computer. Such a computer program is stored in a non-transitory, tangible computer readable storage medium, or any type of media suitable for storing electronic instructions, which are coupled to a computer system bus. Furthermore, any computing systems referred to in the specification may include a single processor or are architectures employing multiple processor designs for increased computing capability.

Disclosed embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An apparatus, comprising:
a processor; and
a memory coupled to the processor, the memory having stored thereon instructions when executed cause the processor to:
  receive a request to forward for the first time a first packet received at the apparatus, the first packet includes a first identifier of a first recipient device of the first packet,
  determine, based on the first identifier, whether the first recipient device is within a wireless range of the apparatus,
  include, based on the determination, the first packet into an outgoing queue,
  establish one or more connections with one or more wireless devices within the wireless range,
  decrement, upon including the first packet into the outgoing queue, a value in the first packet indicating a remaining number of times the first packet is allowed to be transferred from one wireless device to another wireless device,
  forward, for the first time in accordance with the decremented value, the first packet from the outgoing queue to the one or more wireless devices via the established one or more connections,
  receive a second packet having a second identifier of a second recipient device, determine, based on the second identifier, that the second recipient device is the same as the apparatus, and transmit, based on the determination, a reach packet directly to the one or more wireless devices to stop forwarding the second packet.

2. The apparatus of claim 1, wherein the instructions further cause the processor to:

establish duration of discovery intervals of the one or more wireless devices;

define an expiration time of each packet of one or more packets in the outgoing queue to be forwarded from the apparatus;

define a duration of each connection with a wireless device of the one or more wireless devices within the wireless range of the apparatus;

discover at least one wireless device within the wireless range of the apparatus based on receiving a beacon signal from the at least one wireless device; and store an identifier of the at least one discovered wireless device in the list of wireless devices.

3. The apparatus of claim 1, wherein the instructions further cause the processor to:

transmit a request for connection with a wireless device within the wireless range of the apparatus;

receive a hand-shake message transmitted from the wireless device in response to the request, the hand-shake message comprising a unique identifier of the wireless device; and create a connection session with the wireless device based on the received hand-shake message.

4. The apparatus of claim 1, wherein the instructions further cause the processor to:

generate a structure of each packet of one or more packets in the outgoing queue forwarded to a wireless device within the wireless range of the apparatus, the structure comprising a unique identifier of a final recipient of that packet, and a unique identifier of the apparatus.

5. The apparatus of claim 1, wherein the instructions further cause the processor to:

forward the first packet to a wireless device within the wireless range of the apparatus via a connection established by the first module;

receive an acknowledgement transmitted from the wireless device in response to successful reception of the first packet; and mark the first packet as received based on the reception of the acknowledgement.

6. The apparatus of claim 1, wherein the instructions further cause the processor to:

manage the outgoing queue by forwarding each packet of a plurality of packets in the outgoing queue in a separate time slot.

7. The apparatus of claim 1, wherein the instructions further cause the processor to:

manage the outgoing queue comprising a plurality of packets by forwarding the plurality of packets during a same time slot.

8. The apparatus of claim 1, wherein the instructions further cause the processor to:

determine if there is an active connection session with the first recipient device;

send at least one packet from the outgoing queue to the first recipient device, based on establishing the active connection session with the first recipient device;

request a new connection session to be established with the first recipient device, based on determining that there is no active connection session with the first recipient device; and send the at last one packet from the outgoing queue to the first recipient device, after the new connection session is established with the first recipient device.

9. The apparatus of claim 1, wherein the instructions further cause the processor to:

automatically switch between directly sending the first packet to a final recipient of the first packet and forwarding the first packet to the one or more wireless devices within the wireless range of the apparatus.

* * * * *